United States Patent
Merrien et al.

(10) Patent No.: US 9,689,445 B2
(45) Date of Patent: Jun. 27, 2017

(54) FIXED CALIPER DISK BRAKE HAVING STABILIZED BRAKE PADS, AND RELATED ASSEMBLY AND PAD REPLACEMENT METHODS

(71) Applicant: CHASSIS BRAKES INTERNATIONAL B.V., Amsterdam (NL)

(72) Inventors: Sandra Merrien, Paris (FR); Andre Gaye, Dalian (CN); Thierry Bindner, Colmar (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 0 days.

(21) Appl. No.: 14/786,296

(22) PCT Filed: Apr. 23, 2014

(86) PCT No.: PCT/EP2014/058169
§ 371 (c)(1),
(2) Date: Oct. 22, 2015

(87) PCT Pub. No.: WO2014/177428
PCT Pub. Date: Nov. 6, 2014

(65) Prior Publication Data
US 2016/0076612 A1    Mar. 17, 2016

(30) Foreign Application Priority Data

Apr. 29, 2013 (FR) ...................................... 13 53906
Nov. 18, 2013 (FR) ...................................... 13 61275

(51) Int. Cl.
*F16D 55/22*    (2006.01)
*F16D 65/097*   (2006.01)
(Continued)

(52) U.S. Cl.
CPC ....... *F16D 65/0972* (2013.01); *F16D 55/228* (2013.01); *F16D 55/2265* (2013.01);
(Continued)

(58) Field of Classification Search
CPC ............... F16D 65/097; F16D 65/0972; F16D 65/0977; F16D 65/0979; F16D 66/02; F16D 55/228
(Continued)

(56) References Cited

U.S. PATENT DOCUMENTS 3,977,499 A * 8/1976 Johannesen ......... F16D 55/2262
188/73.36
4,460,067 A * 7/1984 Katagiri .................. F16D 66/02
188/1.11 W
(Continued)

FOREIGN PATENT DOCUMENTS

EP    2 072 850 A1    6/2009
FR    2 969 238 A1    6/2012
(Continued)

OTHER PUBLICATIONS

International Search Report, dated Jul. 23, 2014, from corresponding PCT application.

*Primary Examiner* — Thomas Irvin
(74) *Attorney, Agent, or Firm* — Young & Thompson (57) ABSTRACT

A fixed caliper brake includes a caliper housing that includes two opposing blocks. Each of the opposing blocks includes an axial recess, an axial surface for supporting a brake pad, and elements for mounting and axially and slidably guiding the brake pad. The elements include a pad spring that is attached to each related lug of the brake pad, and a steel lamellar element having a spring and being received in the related recess.

19 Claims, 6 Drawing Sheets

(51) Int. Cl.
  *F16D 55/2265* (2006.01)
  *F16D 55/228* (2006.01)
  *F16D 66/02* (2006.01)
  *F16D 121/02* (2012.01)
(52) U.S. Cl.
  CPC ...... *F16D 65/0977* (2013.01); *F16D 65/0979* (2013.01); *F16D 66/02* (2013.01); *F16D 2121/02* (2013.01)
(58) Field of Classification Search
  USPC ............... 188/73.37, 73.35, 73.36, 73.38
  See application file for complete search history.

(56) References Cited

U.S. PATENT DOCUMENTS

| | | | | |
|---|---|---|---|---|
| 5,033,590 | A * | 7/1991 | Kobayashi | F16D 66/02 188/1.11 W |
| 5,687,817 | A * | 11/1997 | Kobayashi | F16D 65/097 188/72.3 |
| 5,699,882 | A * | 12/1997 | Ikegami | F16D 65/0972 188/205 A |
| 5,934,417 | A * | 8/1999 | Kobayashi | F16D 55/227 188/1.11 W |
| 5,947,233 | A * | 9/1999 | Kobayashi | F16D 55/227 188/1.11 W |
| 6,296,085 | B1 * | 10/2001 | Yukoku | F16D 65/0972 188/73.36 |
| 6,527,090 | B1 * | 3/2003 | Barillot | F16D 65/0978 188/73.1 |
| 7,040,464 | B1 * | 5/2006 | Andrews | F16D 65/0978 188/73.38 |
| 7,163,089 | B2 * | 1/2007 | Nogiwa | F16D 65/0977 188/73.38 |
| 7,201,257 | B2 * | 4/2007 | Nakajima | F16D 55/227 188/73.31 |
| 7,318,503 | B2 * | 1/2008 | Farooq | F16D 65/0974 188/205 A |
| 7,455,153 | B2 * | 11/2008 | Ooshima | F16D 65/0972 188/18 A |
| 8,020,674 | B2 * | 9/2011 | Miura | F16D 65/0972 188/73.38 |
| 8,540,060 | B2 * | 9/2013 | Hayashi | F16D 65/097 188/1.11 W |
| 8,776,959 | B2 * | 7/2014 | Kaneko | F16D 65/0977 188/73.31 |
| 8,973,719 | B2 * | 3/2015 | Rossignol | F16D 65/095 188/73.31 |
| 9,016,442 | B2 * | 4/2015 | Odaira | F16D 55/226 188/72.3 |
| 9,388,868 | B2 * | 7/2016 | Merrien | F16D 65/0006 |
| 9,388,869 | B2 * | 7/2016 | Zhang | F16D 65/0972 |
| 2004/0144602 | A1 * | 7/2004 | Ono | F16D 65/0971 188/71.7 |
| 2005/0274579 | A1 * | 12/2005 | Nogiwa | F16D 65/0977 188/73.38 |
| 2007/0251772 | A1 * | 11/2007 | Tsurumi | F16D 65/095 188/73.38 |
| 2009/0159376 | A1 * | 6/2009 | Rossignol | F16D 65/095 188/73.38 |
| 2010/0147635 | A1 * | 6/2010 | Hayashi | F16D 65/0977 188/73.38 |
| 2010/0187050 | A1 * | 7/2010 | Hayashi | F16D 65/097 188/72.3 |
| 2011/0056778 | A1 * | 3/2011 | Roth | F16D 65/0973 188/234 |
| 2012/0090927 | A1 * | 4/2012 | Bach | F16D 65/097 188/72.3 |
| 2012/0222925 | A1 * | 9/2012 | Kaneko | F16D 65/0977 188/73.38 |
| 2014/0291083 | A1 * | 10/2014 | Bernard | F16D 55/2262 188/250 G |
| 2014/0305754 | A1 * | 10/2014 | Bernard | F16D 65/0972 188/250 E |
| 2014/0311839 | A1 * | 10/2014 | Bernard | F16D 65/092 188/250 F |
| 2014/0318905 | A1 * | 10/2014 | Merrien | F16D 55/2265 188/73.38 |
| 2014/0326548 | A1 * | 11/2014 | Merrien | F16D 65/0006 188/73.38 |
| 2015/0129375 | A1 | 5/2015 | Rossignol et al. | |
| 2015/0176666 | A1 * | 6/2015 | Bernard | F16D 65/0972 188/73.31 |
| 2015/0247542 | A1 * | 9/2015 | Yukumi | F16D 65/0977 188/72.3 |
| 2016/0076611 | A1 * | 3/2016 | Boyle | F16D 65/0972 188/72.3 |

FOREIGN PATENT DOCUMENTS

| | | |
|---|---|---|
| WO | 2005/064193 A1 | 7/2005 |
| WO | 2005/064194 A1 | 7/2005 |

* cited by examiner

FIXED CALIPER DISK BRAKE HAVING STABILIZED BRAKE PADS, AND RELATED ASSEMBLY AND PAD REPLACEMENT METHODS

TECHNICAL FIELD OF THE INVENTION

The invention relates to a fixed calliper motor vehicle disk brake.

TECHNICAL BACKGROUND OF THE INVENTION

The invention relates to a fixed calliper motor vehicle disk brake including:
- a disk,
- a calliper casing that straddles the disk,
- at least one brake pad that is adapted to co-operate with a facing lateral face of the brake disk, and
- at least one piston that is mounted to slide axially in a complementary cylinder of the casing and that co-operates with said brake pad to urge it axially in the direction of said lateral face, and in which the calliper casing includes, associated with said at least one brake pad, means for mounting this brake pad and guiding axial sliding thereof relative to the casing.

As a general rule, in a fixed calliper disk brake, the main component is the casing of the calliper, which is a component fastened to a portion of the vehicle, for example a front stub axle, and which radially straddles the outer periphery of a rotating brake disk constrained to rotate with a wheel to be braked.

On respective opposite sides of the disk, hydraulic cylinders (at least one on each side of the disk) in which pistons move by sliding axially are formed in the casing of the calliper.

Brake pads, of which there are generally two, are each placed between at least one piston and the facing annular face of the disk, and hydraulic pressure introduced into the cylinders presses the piston or pistons onto the facing face of the brake pad, and consequently onto the disk.

In known manner, the casing of the calliper is generally made in two parts or two pieces bolted or screwed together, blind bores being machined in each of these two parts to constitute the cylinders receiving the pistons.

The brake pads are accommodated in and guided to slide axially in associated and opposite housings which, for each brake pad, are formed in the associated part or half-casing.

Faces of each housing are designed to guide the associated brake pad, retaining it in position and anchoring it.

The design of the means for mounting the brake pad and guiding its axial sliding relative to the casing is particularly important for the correct operation of such a brake, and notably to solve various problems and for example to prevent the occurrence of unwanted impact noises audible to the driver of the vehicle on contact between the brake pad and the associated parts of the calliper casing.

SUMMARY OF THE INVENTION

The invention proposes a new design of fixed calliper motor vehicle disk brake including:
- a disk,
- a calliper casing that straddles the disk,
- at least one brake pad that is adapted to co-operate with a facing lateral face of the brake disk, and
- at least one piston that is mounted to slide axially in a complementary cylinder of the casing and that co-operates with said brake pad to urge it axially in the direction of said lateral face of the brake disk, and wherein:
a) the calliper casing includes two opposite blocks, respectively at the front and at the rear, each of which includes:
- a C-section axial housing, open horizontally in the direction of the opposite block, that is delimited by an upper face and a lower face of horizontal general orientation;
- an axial bearing surface of vertical general orientation below the housing;

b) the brake pad includes:
- two opposite lateral mounting lugs each of which is received in an associated housing of an associated block of the casing of the calliper and each of which is delimited by an upper facet of horizontal general orientation;
- associated with each lug, a vertically oriented lower facet below the associated lateral lug;

c) means for mounting and guiding axial sliding of the brake pad relative to the fixed casing include:
i) for each lug of the brake pad, a pad spring that is fixed to the associated lug of the brake pad and includes at least one lower sliding branch that co-operates with the lower face of the associated housing and urges said upper facet of the lug vertically upward to bear against the upper face of the associated housing;
ii) for each block of the calliper casing, a spring steel lamellar element which includes at least:
- a C-section upper axial sliding part that is received in and locked into the associated housing (16), that includes a first, lower flange, referred to as the sliding flange, of substantially horizontal general orientation, that is disposed between the sliding branch of the pad spring and the lower face of the housing of the calliper, and a second, upper flange, referred to as the vertical bearing flange, of horizontal general orientation, that is disposed between the upper facet of the associated lug of the brake pad and the upper face of the associated housing; and
- at least one axial bearing lower part including a third flange, referred to as the transverse bearing flange, that extends the sliding flange, that lies in a plane orthogonal to the plane of the sliding flange, that is arranged in contact with the transverse bearing surface of the associated block, and that is adapted to form a transverse abutment for the associated lower facet of the brake pad.

In accordance with other features of the invention:
- the lamellar element is elastically deformable between:
  - an initial state, prior to mounting in the housing of the lug of the brake pad fitted with its pad spring, in which the sliding flange forms with the plane of the lower face of the housing a first acute angle,
  - at least one loaded state after mounting in the housing of the lug of the brake pad fitted with its pad spring, in which the sliding flange forms with the plane of the lower face of the housing a zero angle or a second acute angle the value of which is less than that of the first acute angle, and in which said sliding branch of the pad spring is elastically prestressed;
- the sliding flange includes an anchor tongue that projects downward and co-operates with the lower face of the housing so as to be anchored in this lower face and to lock the upper part in the position mounted in the associated housing;

the lower face of the housing includes a recess in which the anchor tongue is received with no clearance in the axial direction so as to immobilize the lamellar element axially relative to the block;

the lamellar element includes an axial immobilization part that extends upward the vertical second bearing flange that co-operates with a complementary part of the block so as to immobilize the lamellar element axially relative to the block;

an edge of the sliding flange connecting it with the transverse bearing flange includes at least one axial cut-out;

the lamellar element is of symmetrical design with respect to a vertical median transverse plane;

each pad spring includes at least one curved branch that extends in the axial direction and that connects its sliding branch to a branch of the brake pad for fixing it to the lug of the brake pad;

the calliper casing includes two half-casings each of which is delimited by a junction face of vertical and transverse orientation and the two half-casings are fixed to each other by a series of axial fixing screws;

the calliper casing and the means for mounting and guiding the brake pads are of generally symmetrical design with respect to said junction face.

The invention also relates to a method of assembling a disk brake of the type described above, characterized in that it includes:

a first step during which the lamellar elements are locked into the associated housings of the blocks of the calliper, a second step during which the pad springs are fixed to the brake pad, the curved branches being arranged on the same side of the brake pad, a third step during which the brake pad equipped with its two pad springs is introduced into the housings of the blocks of the calliper so that the curved branches of the pad springs enter first so that said branches of said pad springs load the associated lamellar elements and spread apart the first, lower sliding flanges and the vertical second bearing flanges.

The invention relates further to a method of replacing a brake pad of a disk brake of the type described above including:

a first step during which the curved branches of the pad springs are compressed, a second step during which the brake pad fitted with its pad springs is extracted from the housing of the blocks of the calliper, a third step during which a new brake pad is introduced the lugs of which are equipped with two pad springs in the housings of the blocks of the calliper so that the curved branches of the pad springs enter first so that said branches of said pad springs (40) load the lamellar elements and move the first, lower sliding flanges away from the vertical second bearing flanges.

BRIEF DESCRIPTION OF THE DRAWINGS

Other features and advantages of the invention will become apparent on reading the following detailed description, to understand which the appended drawings should be referred to, in which.

DETAILED DESCRIPTION OF THE DRAWINGS

In the following description and the following claims, there are used by way of non-limiting example expressions such as "axial", "transverse" and "vertical" orientations that refer to the trihedron (L, T, V) shown in the figures and to the definitions given in the description, without reference to terrestrial gravity.

In the following description, identical reference numbers designate parts that are identical or have similar functions.

Figure 13:
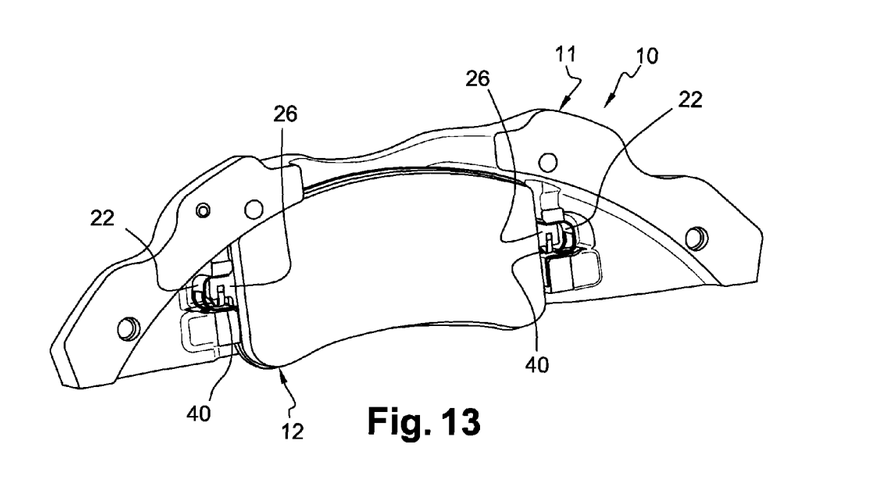
FIG. 13 is a view similar to that of FIG. 9 in which the half-casing is shown equipped with the brake pad from FIG. 10.

FIG. 13 shows the mounting of a brake pad 12 in a fixed calliper 10 of a disk brake.

In known manner, the calliper 10 includes a calliper casing 11 in two parts, of identical of similar general design in terms of mounting and guiding axial sliding of a brake pad 12 associated with each part or half-casing and referring to the actuation of the brake pads 12.

Figure 2:
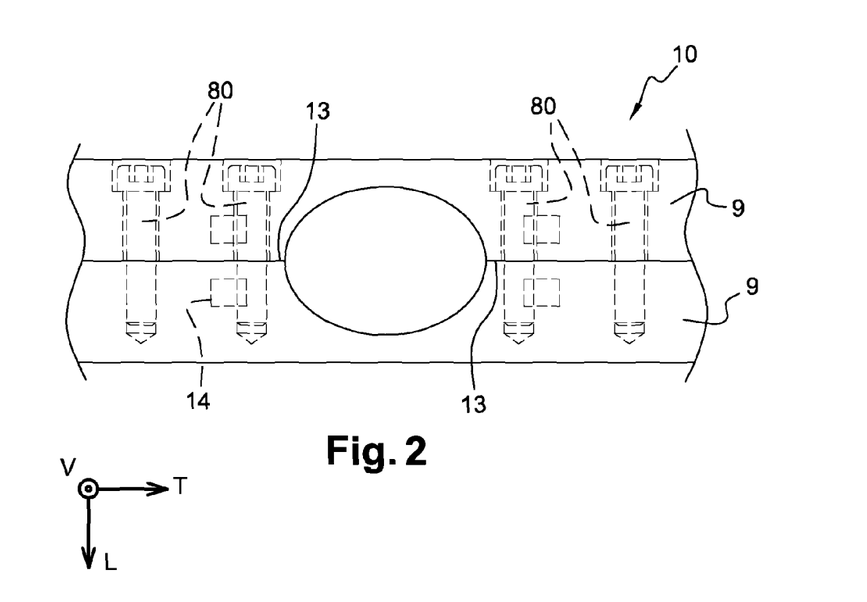
FIG. 2 is a diagrammatic top view that shows the bolted assembly of two half-casings of the type shown in FIG. 1.

As shown diagrammatically in FIG. 2, the calliper casing 11 includes two half-casings each of which is delimited by a junction face 13 of vertical and transverse orientation.

The calliper casing 11 and the means for mounting and guiding the brake pads 12 are of generally symmetrical design with respect to this junction face 13.

The two half-casings are fixed to each other by a series of axial fixing screws 80 that can be seen in FIG. 2.

In known manner, the calliper casing essentially comprises two transversely oriented vertical lateral walls 5 that are connected to each other by a curved top wall 9 in such a manner as to delimit an interior space adapted to receive the radial periphery of an associated brake disk (not shown) that rotates therein.

Figure 1:
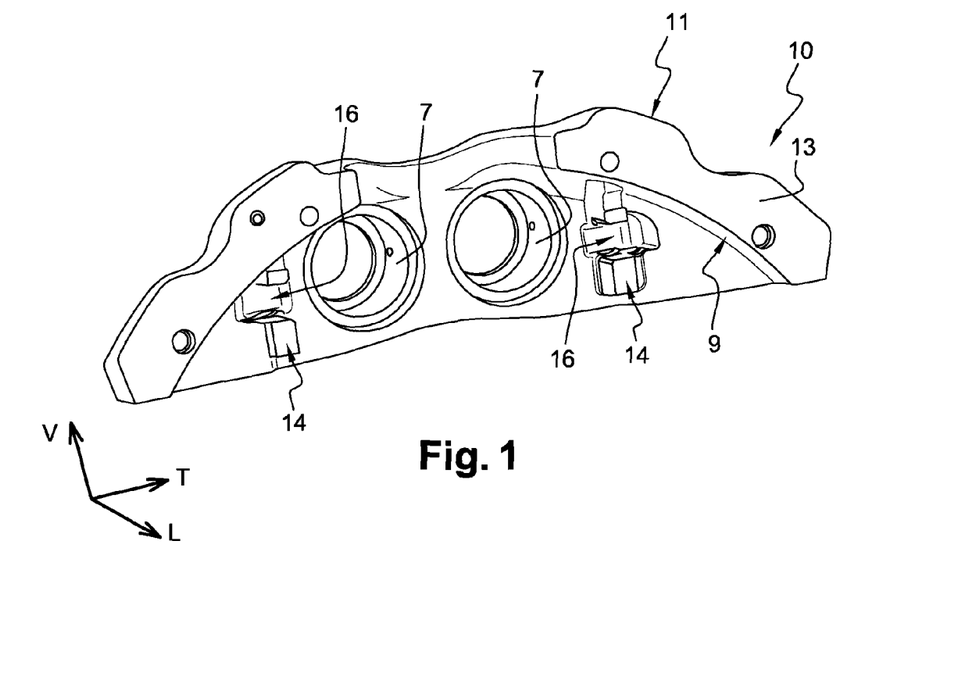
FIG. 1 is a perspective view that shows a half-casing of a fixed calliper of a disk brake in accordance with the invention, which is shown "bare", i.e. with no component or equipment.
Figure 9:
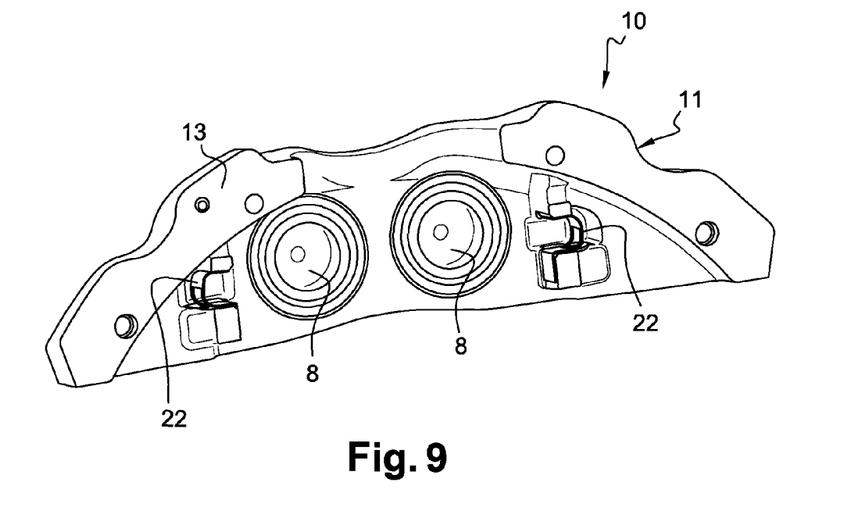
FIG. 9 is a view similar to that of FIG. 1 in which the half-casing is shown equipped with its various components and lamellar elements before mounting the associated brake pads.

Each wall 5 is delimited here by a globally plane internal face 6 onto which open two blind axial and parallel bores 7 in each of which a piston 8 is mounted so that it can slide to constitute two pairs of piston-and-cylinder assemblies for actuating the brake pads 12 (see FIGS. 1, 9).

Each half-casing includes at least two opposite blocks 14 each of which is upstanding with respect to the plane of the internal face 6 and projects axially inward.

Each block 14 includes a housing 16 oriented axially in the direction "L" and having a section in the shape of a C open horizontally in the direction of the opposite block 14. Each housing 16 extends in the axial direction substantially all of the axial depth of the block 14 and therefore substantially as far as the plane of the internal wall 5.

Figure 3:
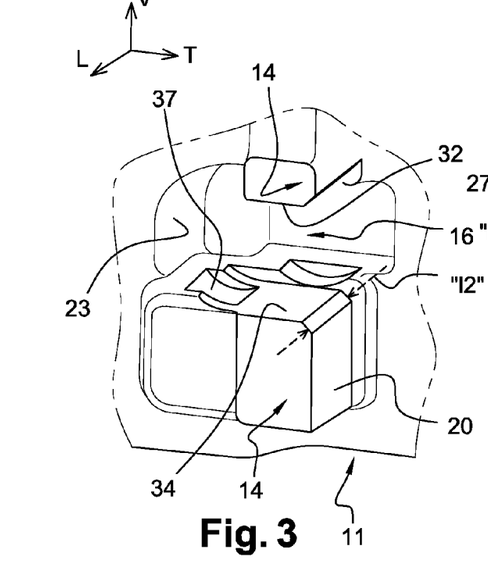
FIG. 3 is a perspective view to a larger scale of a detail from FIG. 1.
Figure 4:
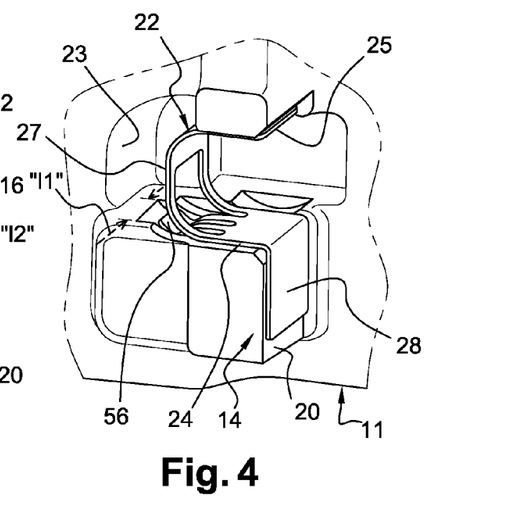
FIG. 4 is a view similar to that of FIG. 3 in which the housing is equipped with its associated lamellar element.

As shown in FIGS. 3 and 4, each block 14 includes an axial housing 16 with a section in the shape of a C open horizontally in the direction of the opposite block delimited by an upper face 32 and a lower face 34 of horizontal general orientation and includes an axial bearing surface 20 of vertical general orientation arranged under the housing 16.

Here the brake includes two opposite brake pads 12 each of which includes two opposite lateral mounting lugs 26 each of which is received in an associated housing 16 of an associated block 14 of the casing 11 of the calliper 10.

Figure 8:
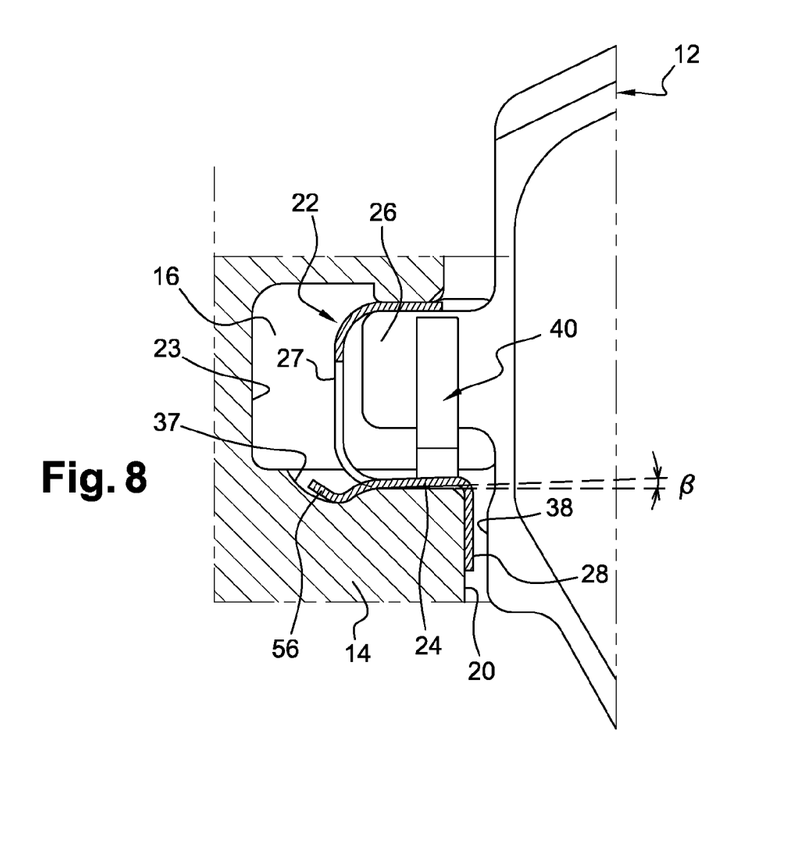
FIG. 8 is a view similar to that of FIG. 7 in which the lamellar element is shown in the housing in its state loaded by the associated brake pad.
Figure 10:
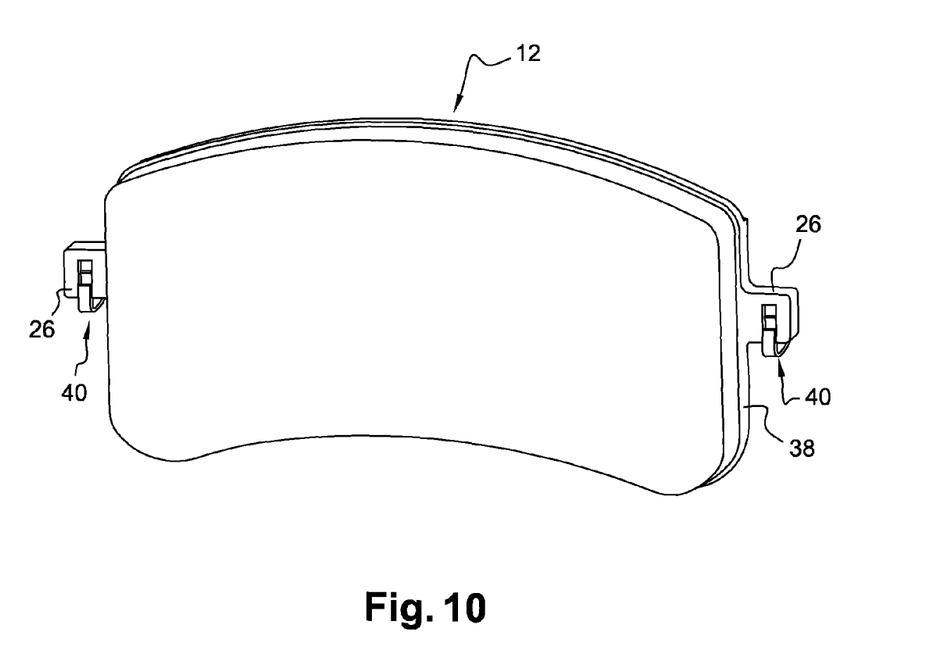
FIG. 10 is a perspective view of a brake pad that is intended to be mounted in the half-casing from FIG. 9 and that is equipped with its two pad springs.
Figures 11, 12:
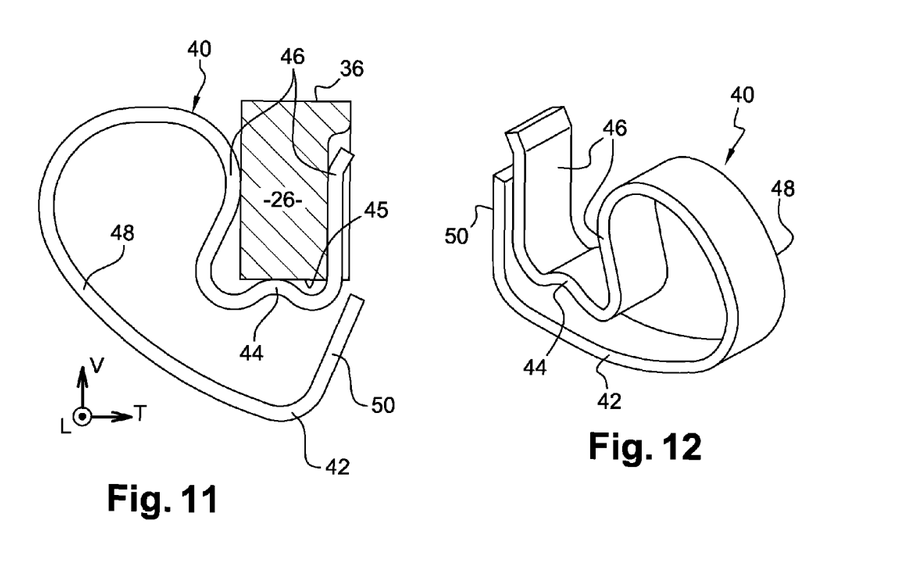
FIG. 11 is a view in section on a vertical axial plane showing the mounting of a pad spring on a lug of the brake pad from FIG. 10.
FIG. 12 is a perspective view showing the design of the pad spring shown in FIG. 11.

As shown in FIGS. 8, 10 and 11, each lug 26 of each brake pad 12 is delimited by an upper facet 36 of horizontal general orientation. Moreover, for each brake pad 12, a vertically oriented lower facet 38 is situated below the associated lateral lug 26.

Moreover a brake pad spring 40 is fixed here to each associated lug 26 of the brake pad 12.

Each pad spring 40 includes at least one lower sliding branch 42 that co-operates with the lower face 34 of the associated housing 16 and loads the upper facet 36 of the lug so that it bears vertically upward against the horizontal upper face 32 of the housing 16.

As FIGS. 11 and 12 show, such a pad spring 40, which is commonly referred to as a "snail spring", may also include, without this limiting the invention, an upper branch 44 bearing on the underside of a horizontal lower facet 45 of the associated lug 26 of the brake pad 12. This upper branch 44 is part of a fixing branch or clip 46 that elastically clips the associated lug 26 of the brake pad 12 to fix the pad spring 40 to the associated lug 26.

The pad spring 40 further includes a curved branch 48 that connects the fixing branch 46 to the lower sliding branch 42. This curved branch 48 primarily provides the elasticity of the pad spring 40.

The pad spring 40 finally includes a free branch 50 that extends the lower sliding branch 42 and closes the profile so as to prevent the stored springs from getting tangled up before they are mounted on the brake pads.

Here each lug 26 is received in an associated housing 16 with a spring steel lamellar element 22 associated with each block 14 of the casing 11 of the calliper 10 between them.

Figure 5:
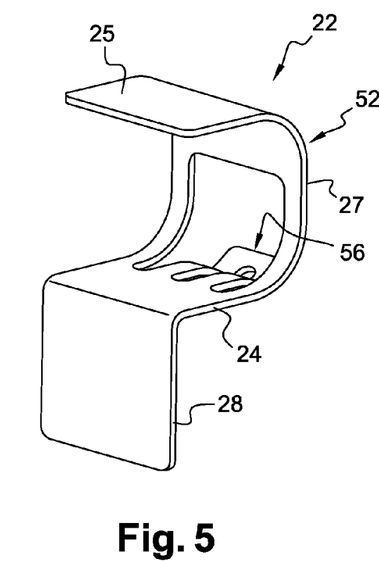
FIGS. 5 and 6 are two perspective views from different angles of the lamellar element shown in the mounted position in FIG. 4.
Figure 6:
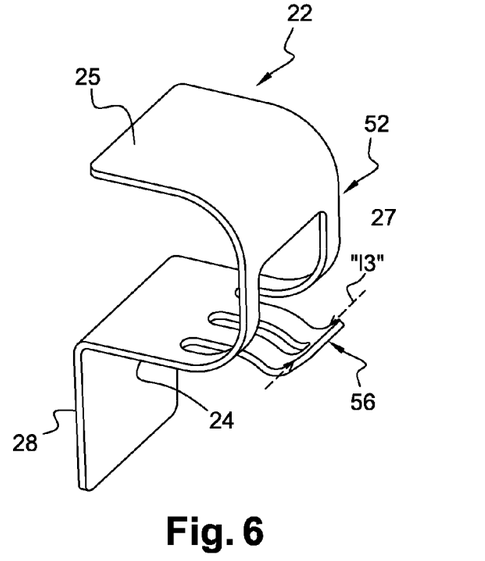

As shown more particularly in FIGS. 5 and 6, such a lamellar element 22 includes an axially oriented upper part 52 referred to as the sliding part with a section in the shape of a C that is received in and locked into the associated housing 16 and includes a first lower sliding flange 24 of substantially horizontal general orientation disposed between the sliding branch 42 of a spring 40 of a brake pad 12 and the lower face 34 of the housing 16.

The upper part 52 of the lamellar element 22 includes a vertical second upper bearing flange 25 of horizontal general orientation disposed between the upper facet 36 of the associated lug 26 of a brake pad 12 and the upper face 32 of the associated housing 16.

The upper part of the lamellar element 22 includes a vertically oriented connecting flange 27 that connects the two horizontal flanges 24 and 25 to each other and is disposed between the lug 26 of the brake pad and the vertical back 23 of the associated housing 16.

The lamellar element 22 further includes an axially oriented lower bearing part 54 including a third transverse bearing flange 28 that extends the sliding flange 24, that lies in a plane orthogonal to the plane of the sliding flange 24, that is arranged in contact with the transverse bearing surface 20 of the block 14 and that is adapted to form a transverse abutment for the associated lower facet 38 of the associated brake pad 12.

In this type of disk brake, the lamellar element 22 therefore includes a first lower sliding flange 24 that is theoretically parallel to the vertical second upper bearing flange 25.

Moreover, the third transverse bearing flange 28, which is outside the housing 16, is substantially orthogonal to the first lower sliding flange 24.

Figure 7:
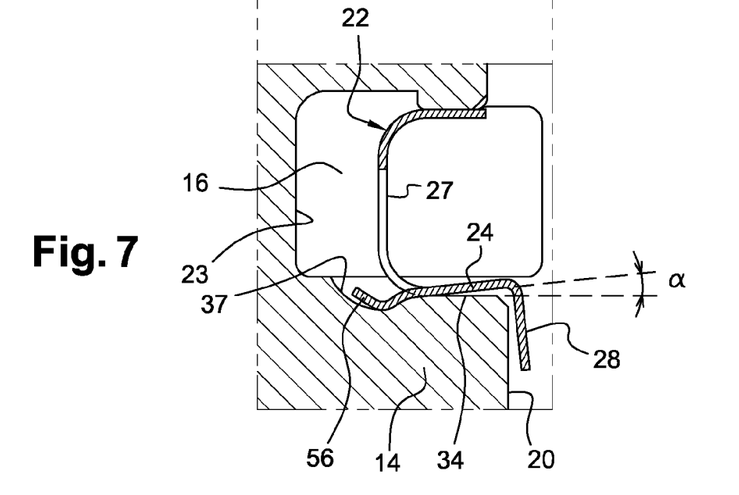
FIG. 7 is a sectional view on a vertical and transverse plane passing through the middle of the lamellar element shown in FIG. 4 and in which the lamellar element is shown in the housing in its initial state.

The first lower sliding flange 24 includes an anchor tongue 56 which here is cut partly into the first lower flange 24 and partly into the vertical connecting flange 27, which projects downward, and which co-operates with the lower face 34 of the housing 16 to be anchored in this lower face 34 of the housing 16, as shown in FIGS. 4, 7 and 8, so as in this way to immobilize the lamellar element 22 axially relative to the housing 16 and also to guarantee plane on plane contact between the flange 25 and the facing upper face 32 of the associated housing 16.

As can be seen in FIGS. 3 and 4 in particular, the lower face 34 of the housing 16 more particularly includes a hollow or recess 37 of transverse general orientation and of concave curved profile that extends a particular constant axial width 11 less than the axial width 12 of the lower face 34.

In a complementary manner, the anchor tongue 56 has a curved profile the convex side of which is oriented downward and the axial width 13 of which is substantially equal to that 11 of the recess 37 so it can be anchored in the recess and in such a manner as to immobilize the anchor tongue 56 axially in the recess 37 and therefore to immobilize the lamellar element 22 axially relative to the associated housing 16.

The design of the lamellar element 22 is liable to induce a preloading of the brake pad spring 40 as soon as it is introduced into the lamellar element 22 and in such a manner as to ensure a low stiffness on the third flange 28.

The lamellar element 22 is elastically deformable between:
  an initial state shown in FIG. 7, prior to mounting in the housing 16 of the lug 26 of the brake pad 12 fitted with its pad spring 14, in which initial state the first sliding flange 24 forms with the plane of the lower face 34 of the housing a first acute angle "α", and
  a loaded state shown in FIG. 8, resulting from mounting in the housing 16 the lug 26 of the brake pad 12 fitted with its pad spring 40, in which loaded state the first sliding flange 24 forms with the plane of the lower face 34 of the housing a zero angle or second acute angle "β" the value of which is lower than that of the first acute angle "α", and in which state the sliding branch 42 of the pad spring is elastically prestressed.

In this configuration, in its initial state, the upper axial sliding part 52 of the lamellar element 22 with a section in the shape of a C is substantially "closed", the first sliding flange 24 also forming an acute angle with any plane parallel to the second upper bearing flange 25.

Similarly, the third transverse bearing flange 28 forms an acute angle with the transverse bearing surface 20 of the block 14.

As soon as the pad spring 40 is introduced into the lamellar element 22, the first sliding flange 24 forms a small acute angle "β" with any plane parallel to the vertical second upper bearing flange 25.

Similarly, the third transverse bearing flange 28 forms an acute angle with the transverse bearing surface 20 of the block 14.

The pad spring 40 is then preloaded by the first sliding flange 24, which makes it possible to ensure a minimum loading and/or prestressing of the brake pad spring 40 when the brake pad 12 is subjected to a rotation torque resulting from the brake pad rubbing on the brake disk.

Finally, in the extreme cases of loading of the pad spring 40 by the brake pad 12, and notably if the brake pad tends to be moved transversally/horizontally in the direction "T", the force exerted tends to press the third transverse bearing flange 28 flat against the transverse bearing surface 20 of the block 14, thereby guaranteeing a plane-to-plane contact best able to absorb the forces at a low braking pressure by virtue of the angles referred to above.

In one embodiment of the invention, a transverse median plane passing substantially through the lugs 26 of the brake pad 12 passes substantially through a median point of application of the braking forces of the brake pad 12 to the brake disk.

Moreover, the vertical face 20 and the flange 28 of the lamellar element are arranged under this median point of application of the braking forces of the brake pad on the disk.

This arrangement makes it possible to determine substantially the positioning of the point of application of the reaction forces of the blocks 14 on the brake pad 12 and therefore to determine the reaction torque that is exerted around the median point of application of the braking forces of the brake pad 12 on the disk.

The total torque to which the brake pad 12 is subjected, resulting from the torque exerted by the disk on the brake pad 12 and from the reaction torque exerted by the blocks 14 on the brake pad 12, is therefore always oriented in the same direction, which guarantees the stability of the brake pad 12 during braking.

The anchor tongue 56 is cut so as to be independent of the sliding flange, which makes it possible to choose the values of the angles "α" and "β" without compromising the correct positioning of the lamellar element in its housing.

The instability of the brake pad and the risk of associated noise and/or vibration are favored by an increase in the stiffness or rigidity and consequently in the intensity of the return force exerted by the third flange 28 whereas, to the contrary, the brake pad is stabilized for "medium" or "strong" braking forces by virtue of the fact that the brake pad is entrained by the rotation of the disk.

This limited stiffness advantageously results from the geometry of the lamellar element, notably from the angle "β". It may also result from cutting, as described hereinafter.

Figure 14:
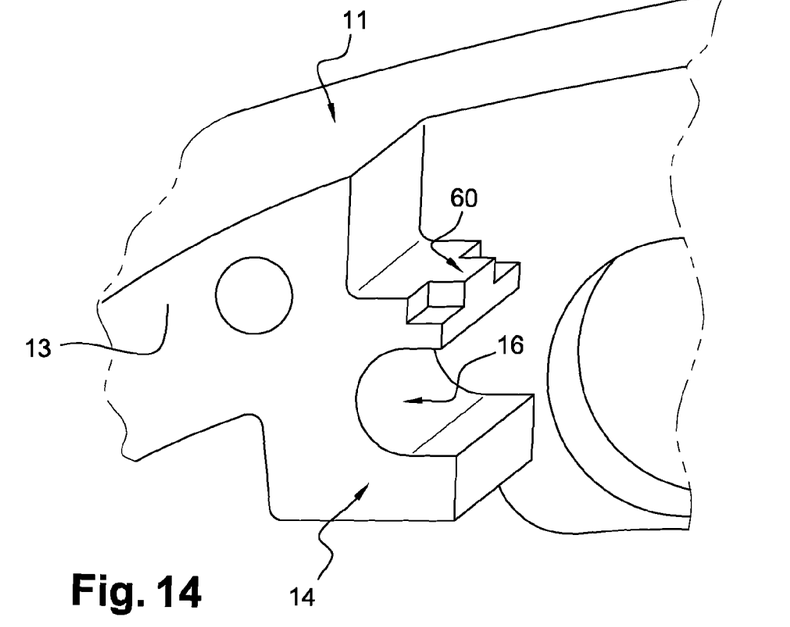
FIGS. 14 and 15 are detail views showing a variant embodiment of the lamellar element and the associated block of the half-casing adapted to receive this variant of the lamellar element.
Figure 15:
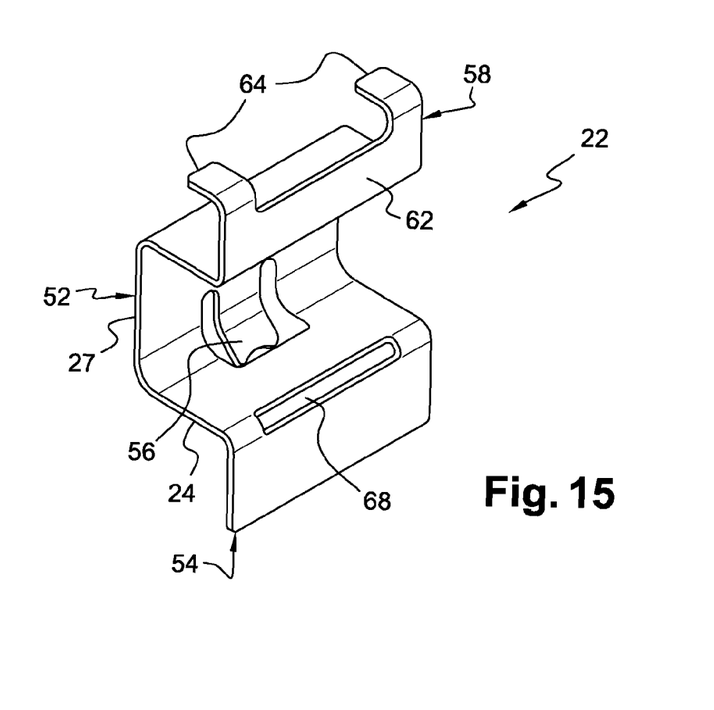

The variant embodiment shown in FIGS. 14 and 15 is described next.

As FIG. 15 shows, to guarantee optimum positioning of the third transverse bearing flange against the transverse bearing surface 20 of the arm 14, an edge 66 connecting the sliding flange 24 and the transverse bearing flange 28 may include at least one axial cut-out 68.

This cut-out makes it possible to reduce the angular stiffness of the edge 66 in order to favor the deployment or "opening" of the transverse bearing flange.

Here the axial cut-out 68 extends symmetrically along the connecting edge 66 and over the major part of the axial width of the connecting edge 66.

This cut-out may be produced in the same manner and for the same purpose in a lamellar element 22 of the type shown in FIGS. 5 and 6.

In the same manner as for the lamellar element 22 described above, a fixing or anchoring tongue or lug 56 projects vertically downward and co-operates with the lower face 34 of the housing 16 so as to be anchored to this lower face 34 of the housing 16, which face 34 is "smooth" here because it includes no recesses.

Here the lamellar element 22 includes an upper axial immobilization part 58 that extends the second flange 25 upward and co-operates with a complementary part 60 of the block 14 to immobilize the lamellar element 22 axially relative to the block 14.

As FIGS. 14 and 15 show, the complementary part 60 of the block is conformed as a stud shorter in the axial direction than the housing 16 and the block 14 and the immobilization part 58 of the lamellar element 22 essentially includes a vertical fourth flange 62 from which extend two lugs 64 that axially grip the part 60 in the form of a stud that constitutes an axial abutment with which the two opposite lugs 64 co-operate.

A method of assembling a disk brake in accordance with the invention is described next.

This assembly method includes a first step during which the lamellar elements 22 are placed in and locked into the associated housings 16 of the blocks 14 of the calliper 11.

Next the method includes a second step during which the pad springs 40 are fixed to the brake pad 12, the curved branches 48 being arranged on the same side of the brake pad 12.

The method then includes a third step during which the brake pad 12, fitted beforehand with its two pad springs 40, is introduced into the housings 16 of the blocks 14 of the calliper 11, the curved branches 48 of the pad springs 40 entering first so that these branches 48 of the pad springs 40 load the lamellar elements 22 and separate the first lower sliding flanges 24 from the vertical second bearing flanges 25 and thereby prestress the pad springs 40.

Once assembled, the two half-casings may be screwed to each other to constitute the complete casing 11.

In a similar manner, a method of replacing a brake pad 12 is associated with the disk brake in accordance with the invention.

The invention makes it possible to propose a disk brake in which unwanted movements of the brake pads 12 are eliminated, which makes it possible to stabilize the brake pads 12 and guarantees increased longevity of the friction linings of the brake pads 12 whilst limiting braking noises.

Moreover the design of the means for mounting and guiding axial sliding of each brake pad relative to the fixed casing make it possible to provide a free space in the top wall of the calliper and the architecture in accordance with the invention notably makes it possible to accommodate therein, if appropriate, an additional longitudinal bridge of material, so as to increase further the stiffness, and if necessary to add therein an axial fixing screw.

The invention claimed is:

1. A fixed caliper (10) motor vehicle disk brake comprising:
a disk,
a caliper casing (11) that straddles the disk,
at least one brake pad (12) that is adapted to co-operate with a facing lateral face of the disk, and
at least one piston (8) that is mounted to slide axially in a complementary cylinder (7) of the caliper casing and that co-operates with said brake pad (12) to urge it axially in the direction of said lateral face of the brake disk,
and wherein:
a) the caliper casing (11) comprises two opposite blocks (14), respectively at the front and at the rear, each of which comprises:
a C-section axial housing (16), open horizontally in a direction of the opposite block (14), that is delimited by an upper face (32) and by a lower face (34) of horizontal general orientation;
an axial bearing surface (20) of vertical (V) general orientation below the C-section axial housing (16);
b) the brake pad (12) comprises:
two opposite lateral mounting lugs (26) each of which is received in an associated housing (16) of an associated block (14) of the casing (11) of the caliper and each of which is delimited by an upper facet (36) of horizontal general orientation;
associated with each lug (26), a vertically oriented lower facet (38) below the associated lateral lug (26);
c) said fixed caliper (10) further comprises means (40, 22) for mounting and guiding axial sliding of the brake pad relative to the fixed casing comprising:
i) for each lug (26) of the brake pad (12), a pad spring (40) that is fixed to the associated lug (26) of the brake pad (12) and comprises at least one lower sliding branch (42) that co-operates with the lower face (34) of the associated housing (16) and urges said upper facet (36) of the lug (26) vertically upward to bear against the upper face (32) of the associated housing (16);
ii) for each block (14) of the caliper casing (11), a spring steel lamellar element (22) which comprises at least:
a C-section upper axial sliding part (52) that is received in and locked into the associated housing (16), that comprises a first, lower flange (24), referred to as the sliding flange, of substantially horizontal general orientation, that is disposed between the sliding branch (42) of the pad spring (40) and the lower face (34) of the housing (16) of the caliper (11), and a second, upper flange (25), referred to as the vertical bearing flange, of horizontal general orientation, that is disposed between the upper facet (36) of the associated lug (26) of the brake pad (12) and the upper face (32) of the associated housing (12); and
at least one axial bearing lower part (54) comprising a third flange (28), referred to as the transverse bearing flange, that extends the sliding flange (24), that extends in a plane orthogonal to the plane of the sliding flange (24), that is arranged in contact with the transverse bearing surface (20) of the associated block (14), and that is adapted to form a transverse abutment for the associated lower facet (38) of the brake pad (12).

2. The fixed caliper disk brake as claimed in claim 1, wherein the lamellar element (22) is elastically deformable between:
an initial state, prior to mounting in the housing (16) of the lug (26) of the brake pad (12) fitted with its pad spring (40), in which the sliding flange (24) forms with the plane of the lower face (34) of the housing (16) a first acute angle ($\alpha$),
at least one loaded state after mounting in the housing (16) of the lug (26) the brake pad (12) fitted with its pad spring (40), in which the sliding flange (24) forms with the plane of the lower face (34) of the housing (16) a zero angle or a second acute angle ($\beta$) the value of which is less than that of the first acute angle ($\alpha$), and in which said sliding branch (42) of the pad spring (40) is elastically prestressed.

3. The disk brake as claimed in claim 2, wherein the sliding flange (24) comprises an anchor tongue (56) that projects downward and co-operates with the lower face (34) of the housing (16) so as to be anchored in this lower face (34) and to lock the upper part (52) in the position mounted in the associated housing (16).

4. The disk brake as claimed in claim 3, wherein the lower face (34) of the housing (16) comprises a recess (37) in which the anchor tongue (56) is received with no clearance in the axial direction so as to immobilize the lamellar element (22) axially relative to the block (14).

5. The disk brake as claimed in claim 4, wherein the lamellar element (22) comprises an axial immobilization part (58) that extends upward the vertical second bearing flange (25) that co-operates with a complementary part (60) of the block (14) so as to immobilize the lamellar element (22) axially relative to the block (14).

6. The disk brake as claimed in claim 5, wherein an edge (66) of the sliding flange (24) connecting it with the transverse bearing flange (28) comprises at least one axial cut-out (68).

7. The disk brake as claimed in claim 6, wherein the lamellar element (22) is of symmetrical design with respect to a vertical median transverse plane.

8. The disk brake as claimed in claim 7, wherein each pad spring (40) comprises at least one curved branch (48) that extends in the axial direction and that connects its sliding branch (42) to a branch (46) of the brake pad for fixing it to the lug (12) of the brake pad.

9. A method of assembling a disk brake as claimed in claim 8, further comprising:
a first step during which the lamellar elements (22) are locked into the associated housings (16) of the blocks (14) of the caliper (11),
a second step during which the pad springs (40) are fixed to the brake pad (12), the curved branches (48) being arranged on the same side of the brake pad (12),
a third step during which the brake pad (12) equipped with its two pad springs (40) is introduced into the housings (16) of the blocks (14) of the caliper (11) so that the curved branches (48) of the pad springs (40) enter first so that said branches of said pad springs (40) load the associated lamellar elements (22) and spread apart the first, lower sliding flanges (24) and the vertical second bearing flanges (25).

10. A method of replacing a brake pad of a disk brake as claimed in claim 8, further comprising:
a first step during which the curved branches (48) of the pad springs (40) are compressed, a second step during which the brake pad (12) fitted with its pad springs (40) is extracted from the housings (16) of the blocks (14) of the caliper (11), a third step during which a new brake pad (12) is introduced the lugs (26) of which are equipped with two pad springs (40) in the housings (16) of the blocks (14) of the caliper so that the curved branches (48) of the pad springs (14) enter first so that said branches (48) of said pad springs (40) load the lamellar elements (22) and move the first, lower sliding flanges (24) away from the vertical second bearing flanges (25).

11. The disk brake as claimed in claim 2, wherein the lamellar element (22) comprises an axial immobilization part (58) that extends upward the vertical second bearing flange (25) that co-operates with a complementary part (60) of the block (14) so as to immobilize the lamellar element (22) axially relative to the block (14).

12. The disk brake as claimed in claim 2, wherein the lamellar element (22) is of symmetrical design with respect to a vertical median transverse plane.

13. The disk brake as claimed in claim 2, wherein each pad spring (40) comprises at least one curved branch (48) that extends in the axial direction and that connects its sliding branch (42) to a branch (46) of the brake pad for fixing it to the lug (12) of the brake pad.

14. The disk brake as claimed in claim 1, wherein the caliper casing (11) comprises two half-casings each of which is delimited by a junction face (13) of vertical and transverse orientation and the two half-casings are fixed to each other by a series of axial fixing screws (80).

15. The disk brake according claim 14, wherein the caliper casing (11) and the means for mounting and guiding the brake pads are of generally symmetrical design with respect to said junction face (13).

16. The disk brake as claimed in claim 1, wherein the lamellar element (22) comprises an axial immobilization part (58) that extends upward the vertical second bearing flange (25) that co-operates with a complementary part (60) of the block (14) so as to immobilize the lamellar element (22) axially relative to the block (14).

17. The disk brake as claimed in claim 1, wherein an edge (66) of the sliding flange (24) connecting it with the transverse bearing flange (28) comprises at least one axial cut-out (68).

18. The disk brake as claimed in claim 1, wherein the lamellar element (22) is of symmetrical design with respect to a vertical median transverse plane.

19. The disk brake as claimed in claim 1, wherein each pad spring (40) comprises at least one curved branch (48) that extends in the axial direction and that connects its sliding branch (42) to a branch (46) of the brake pad for fixing it to the lug (12) of the brake pad.

* * * * *